United States Patent
Jessen et al.

(10) Patent No.: US 11,220,945 B2
(45) Date of Patent: Jan. 11, 2022

(54) METHOD FOR OPERATING AN INTERNAL COMBUSTION ENGINE WITH A SECONDARY AIR SYSTEM

(71) Applicant: Robert Bosch GmbH, Stuttgart (DE)

(72) Inventors: Holger Jessen, Ludwigsburg (DE); Michael Baeuerle, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/308,797

(22) Filed: May 5, 2021

(65) Prior Publication Data
US 2021/0348539 A1    Nov. 11, 2021

(30) Foreign Application Priority Data

May 6, 2020 (DE) ..................... 10 2020 205 719.2

(51) Int. Cl.
  *F01N 3/32* (2006.01)
  *F01N 3/22* (2006.01)
(52) U.S. Cl.
  CPC ............... *F01N 3/323* (2013.01); *F01N 3/22* (2013.01); *F01N 3/222* (2013.01); *F01N 3/225* (2013.01); *F01N 3/32* (2013.01); *F01N 2270/00* (2013.01); *F01N 2270/10* (2013.01); *F01N 2550/14* (2013.01); *F01N 2610/085* (2013.01)
(58) Field of Classification Search
  CPC ........... F01N 3/22–227; F01N 3/30–34; F01N 2270/00; F01N 2270/02; F01N 2270/10; F01N 2550/14; F01N 2610/085; F01N 2900/1804
  USPC ......... 60/273, 274, 277, 280, 289, 290, 303, 60/304, 307, 308
  See application file for complete search history.

(56) References Cited

U.S. PATENT DOCUMENTS

| 4,534,173 A | * | 8/1985 | Tsukamoto | ............... F01N 3/22 60/606 |
| 5,487,407 A | * | 1/1996 | Eaker | ....................... F01N 3/22 137/522 |

(Continued)

FOREIGN PATENT DOCUMENTS

| DE | 10 2006 021 964 A1 | 11/2007 |
| DE | 10 2012 222 868 A1 | 6/2014 |

(Continued)

*Primary Examiner* — Mark A Laurenzi
*Assistant Examiner* — Mickey H France
(74) *Attorney, Agent, or Firm* — Maginot, Moore & Beck LLP

(57) ABSTRACT

A method is disclosed for operating an internal combustion engine which comprises a primary air system for providing fresh air and a secondary air system. The secondary air system is configured to branch off secondary air from the primary air system and blow it into an exhaust gas duct. The secondary air system has a compressor for feeding the secondary air and a secondary air valve for shutting off or enabling the blowing in of secondary air. The method includes (i) activating the compressor while the secondary air valve is kept closed, (ii) determining whether compressor surging is occurring or is directly imminent, (iii) sensing at least one sensor signal if compressor surging is occurring or is directly imminent, and (iv) determining whether there is a leak in the secondary air system, on the basis of the sensed sensor signal.

16 Claims, 2 Drawing Sheets

(56) References Cited

U.S. PATENT DOCUMENTS

| | | | | |
|---|---|---|---|---|
| 7,685,810 B2* | 3/2010 | Hirata | | F01N 11/00 60/277 |
| 7,934,486 B1* | 5/2011 | Styles | | F01N 3/2066 123/406.23 |
| 2004/0107697 A1* | 6/2004 | Liu | | F01N 3/0842 60/297 |
| 2007/0113544 A1* | 5/2007 | Nishina | | F01N 3/208 60/286 |
| 2009/0013687 A1* | 1/2009 | Swenson | | F02D 23/00 60/600 |
| 2009/0024295 A1* | 1/2009 | Swenson | | G01M 15/042 701/100 |
| 2010/0139268 A1* | 6/2010 | Huber | | F02B 37/001 60/602 |
| 2010/0222981 A1* | 9/2010 | Hacker | | F01N 3/22 701/102 |
| 2013/0111901 A1* | 5/2013 | Leone | | F01N 1/163 60/611 |
| 2014/0130777 A1* | 5/2014 | Kuroki | | F02D 19/025 123/445 |
| 2014/0140821 A1* | 5/2014 | Pursifull | | F02B 37/164 415/145 |
| 2015/0047342 A1* | 2/2015 | McConville | | F02D 41/0007 60/600 |
| 2015/0047347 A1* | 2/2015 | Ulrey | | F02M 26/06 60/605.2 |
| 2015/0075162 A1* | 3/2015 | Yoshioka | | F02M 26/22 60/605.2 |
| 2015/0082771 A1* | 3/2015 | Odello | | F02D 41/0072 60/274 |
| 2015/0096296 A1* | 4/2015 | Banker | | F02D 41/0007 60/611 |
| 2015/0121864 A1* | 5/2015 | Surnilla | | F02D 41/0072 60/605.2 |
| 2016/0160868 A1* | 6/2016 | Xiao | | F04D 27/001 415/1 |
| 2017/0211440 A1* | 7/2017 | Salsgiver | | B01D 41/04 |
| 2017/0314442 A1* | 11/2017 | Lipa | | F01N 3/101 |
| 2018/0128145 A1* | 5/2018 | Uhrich | | F01N 1/168 |
| 2018/0195470 A1* | 7/2018 | Bevan | | F01N 3/005 |
| 2019/0316538 A1* | 10/2019 | Martin | | F02B 37/10 |
| 2020/0309069 A1* | 10/2020 | Eser | | F01N 3/035 |
| 2021/0003057 A1* | 1/2021 | Hay | | F01N 3/101 |

FOREIGN PATENT DOCUMENTS

| | | |
|---|---|---|
| DE | 10 2015 015 484 B3 | 3/2017 |
| DE | 10 2017 111 122 A1 | 11/2017 |

* cited by examiner

METHOD FOR OPERATING AN INTERNAL COMBUSTION ENGINE WITH A SECONDARY AIR SYSTEM

This application claims priority under 35 U.S.C. § 119 to patent application no. DE 10 2020 205 719.2, filed on May 6, 2020 in Germany, the disclosure of which is incorporated herein by reference in its entirety.

BACKGROUND

The present disclosure relates to a method for operating an internal combustion engine which has a secondary air system, and to an internal combustion engine.

For a cold start a spark ignition engine usually requires a "rich mixture", that is to say a fuel/air mixture with an excess of fuel. As a result, large quantities of carbon monoxide and unburnt hydrocarbons are produced in the cold start phase. Since the catalytic converter has not yet reached its operating temperature in this phase, these noxious components of exhaust gas can escape into the environment without after-treatment. In order to avoid this and to reduce the pollutants during the cold start phase, oxygen-rich ambient air is blown into the exhaust system upstream of the catalytic converter using a secondary air system. As a result, post-oxidation of the pollutants occurs to form harmless carbon dioxide and water. The heat which is produced here additionally heats up the catalytic converter and shortens the time until the lambda control starts. The secondary air system must usually test on a regular basis for faults such as leaks. Devices or methods for carrying out tests for leaks are often complex and expensive in this context or entail an increased risk of the disruption of components of the secondary air system.

SUMMARY

The method according to the disclosure provides the advantage of very simple and effective testing for leaks, as a result of which a reliable and cost-effective possible way of detecting leaks in the secondary air system is made possible. This is achieved according to the disclosure by a method for operating an internal combustion engine which comprises a primary air system and a secondary air system. The primary air system provides fresh air, in particular for the combustion in a combustion space of the internal combustion engine. The secondary air system is configured to branch off secondary air from the primary air system. The secondary air system comprises here a compressor which feeds the secondary air. The compressor is, in particular, a fluid working machine which preferably operates continuously. The compressor can also be referred to, in particular, as a "turbo-compressor".

In addition, the secondary air system comprises a secondary air valve which is configured to shut off, enable or control the blowing in of secondary air. In particular, the secondary air valve is configured to shut off, enable or regulate a secondary air duct which preferably connects the primary air system to the exhaust gas duct.

The primary air system preferably comprises an air filter, wherein the secondary air system is connected to the air filter in order to branch off the secondary air therefrom. The internal combustion engine is particularly preferably a spark ignition engine which has a catalytic converter for after-treatment of exhaust gas. The secondary air system is preferably provided here for a cold start of the internal combustion engine, in order to bring about post-oxidation of unburnt hydrocarbons, which are present in the exhaust system and which are produced when a cold start occurs, upstream of the catalytic converter. In this way, the quantity of harmful exhaust-gas constituents upon cold starting can be reduced, above all by virtue of the fact that the catalytic converter is heated particularly quickly to the operating temperature by the heat which is produced during the post-oxidation.

The method for operating the internal combustion engine comprises here the following steps:

activating the compressor while the secondary air valve is kept closed, determining whether compressor surging is occurring or is directly imminent, sensing at least one sensor signal if compressor surging is occurring or is directly imminent, and determining whether there is a leak in the secondary air system, on the basis of the sensed sensor signal.

In other words, when the secondary air valve is closed the compressor is operated so that the latter feeds air counter to the closed secondary air valve. In particular, in this way the pressure in the secondary air duct rises strongly in a very short time. Since, for example if it is assumed that the secondary air system does not have a leak, the blocking off caused by the secondary air valve prevents any mass flow of air from being fed, an operating part of the compressor is moved very quickly in the direction of the surge limit or above. When the surge limit is exceeded, so-called compressor surging begins.

"Compressor surging" is understood here to be a phenomenon which occurs when a minimum mass flow of fed air is undershot at a defined pressure which is generated by the compressor. The incoming flow against the compressor blades of the compressor depends on this fed mass flow. When the mass flow is too small, the incoming flow angle is so large that the flow in the compressor stalls. As a result, the fed mass flow drops further and the pressure difference between the outlet and the inlet of the compressor cannot be maintained. A backflow occurs through the compressor in this context. The pressure ratio drops and the compressor continues to feed until the surge limit, that is to say upward transgression of the surge limit, is reached again, in particular as a result of the minimum mass flow being undershot. This process occurs cyclically with a specific frequency. The term "compressor surging" is preferably understood to refer here not only to a complete periodic stall at the compressor but also to what is referred to as a "rotating stall", that is to say a stall at only individual blades of the compressor. Such a rotating stall can move along in the blade row, for example counter to the direction of rotation of the compressor.

Compressor surging can be detected in a wide variety of ways, for example on the basis of an analysis of a wide variety of sensor signals. In addition, it is also possible to detect on the basis of sensor signals which directly precede compressor surging that compressor surging is directly imminent. The term "directly imminent" is preferably understood here to mean that compressor surging will occur within a few milliseconds, for example at most 10 ms, in particular if no measures for preventing compressor surging are taken.

In this context, different sensor signals are preferably acquired for the detection of compressor surging or imminent compressor surging as well as for the detection of leaks. Alternatively, one and the same sensor signal can be used. Therefore, the detection of compressor surging or imminent compressor surging as well as the detection of leaks can preferably be carried out on the basis of precisely one sensor signal. In this case, the sensing of the sensor signal is preferably carried out during the entire operating period of the secondary air system.

When compressor surging or corresponding precursor features are detected, the at least one sensor signal is sensed at the same time. On the basis of an analysis of this sensed sensor signal it is then detected whether there is a leak in the secondary air system. For example, for this it is possible to determine on the basis of the sensor signal whether an instantaneous operating characteristic of the compressor corresponds to an expected ideal operating characteristic which is known, for example, on the basis of a compressor characteristic diagram of the compressor. Therefore, when there is a significant deviation it is preferably possible to infer a leak in the secondary air system. Alternatively or additionally, further parameters of the secondary air system and/or of the air can be sensed as a sensor signal and it can be detected therefrom whether there is a leak in the secondary air system when compressor surging occurs.

It is preferably also possible in the method that a case occurs in which owing to a leak the compressor cannot be activated to the point of compressor surging at all, since, for example owing to the leak, a large mass flow which is of air which is sufficient to prevent surging can flow out. In this case, in the method the presence of a leak in the secondary air system can be detected on the basis of the failure to determine whether compressor surging is occurring or is directly imminent.

The method therefore provides a particularly simple and cost effective way of testing for leaks in a secondary air system. In this context, through the detection of compressor surging, which, for example with a compressor with a defined configuration, is known and is predetermined precisely on the basis of the surge limit, the method permits very precise detection as to whether the secondary air system is sealed or has a leak. It is particularly advantageous here that by determining whether compressor surging is occurring or is directly imminent it is possible to take additional measures in order to prevent strong compressor surging or compressor surging which persists over a long time period, or, for example, to prevent the occurrence of compressor surging at all, in order to avoid damage to the compressor. According to an alternative consideration, the method therefore permits, according to the precondition of there being a possible way of checking for leaks, that a particularly efficient compressor, that is to say a flow working machine, be used in a secondary air system. As a result, a particularly efficient and therefore also cost-effective secondary air system can be provided which meets in particular the precondition of a way of testing for leaks.

The compressor is preferably a radial compressor, a diagonal compressor or an axial compressor. In this context, a radial compressor which can provide a high pressure ratio with small installation space, and therefore permits a particularly high efficiency level of the blowing in of secondary air, is particularly advantageous here.

The sensor signal particularly preferably has a rotational speed signal and/or a flow signal of the compressor. In particular, the rotational speed signal is based on an instantaneous rotational speed of a rotor of the compressor. The flow signal preferably corresponds to a profile of the flow which is provided to a motor of the compressor which drives the rotor. The rotational speed signal and/or flow signal are known in a compressor which can be regulated electronically, and therefore provides a particularly simple and cost-effective way of detecting leaks.

The secondary air system also preferably comprises a pressure sensor. The sensor signal which is sensed for the determination of the leak has here a pressure signal which is generated by the pressure sensor. The pressure sensor is preferably arranged on the secondary air duct between the compressor and the secondary air valve. As a result, the pressure which is generated by the compressor can be sensed particularly precisely, and on the basis thereof it is possible to detect whether there is a leak.

The compressor surging is also preferably detected by means of an oscillations of the sensor signal. This means that the sensor signal is used not only for determining the leak but additionally for determining whether compressor surging is taking place, which permits a particularly simple and efficient method to be obtained. In this context it is particularly advantageous, for the purpose of permitting precise testing for leaks, to operate the compressor always at least until compressor surging begins.

The plausibility of the sensor signal is preferably tested in order to determine whether there is a leak in the secondary air system. The plausibility testing of the sensed signal is carried out here by means of an ideal sensor signal which has been determined in a leak-free state of the secondary air system. That is to say a reference test, in which the ideal sensor signal is sensed in a leak-free state of the secondary air system and, in particular, stored, occurs, for example, before initial activation of the secondary air system. By comparing the instantaneous sensor signal, sensed while the method is being carried out, with the ideal sensor signal it is therefore particularly easily possible to detect whether the sensed sensor signal deviates significantly from the ideal sensor signal, in response to which it is possible to infer that there is a leak in the secondary air system.

A leak in the secondary air system is preferably detected from the fact that the sensed sensor signal, in particular a signal value of the sensor signal, lies outside a predefined value range. As a result, it is also possible to particularly easily detect whether the sensed sensor signal deviates highly from an expected ideal sensor signal, in order to determine whether there is a leak in the secondary air system.

The value range is preferably adapted as a function of a change in the geodetic height of the internal combustion engine and/or in the ambient air pressure and/or the ambient temperature. Since, for example, the density of the air depends on the specified parameters, the pressure ratio which is generated by the compressor also depends on these parameters. By taking them into account in the execution of the method, the sensor signal can therefore be analyzed particularly precisely and reliably in order to determine whether there is a leak in the secondary air system.

A compressor rotational speed is also preferably increased during the activation of the compressor. The increasing of the compressor rotational speed preferably occurs continuously here. In particular, the compressor rotational speed is increased starting from a stationary state of the compressor, that is to say a rotational speed of zero. This means that the rotational speed of the compressor is slowly increased until compressor surging or imminent compressor surging is registered. It is particularly advantageous here if the presence of a leak is determined by means of the rotational speed signal or the power consumption of the compressor. In this context, the secondary air system is preferably detected as being leak-free if a rotational speed which is sensed during the occurrence of compressor surging or a current is less than or equal to a predefined setpoint rotational speed or setpoint current. If, on the other hand, a leak is present, compressor surging does not occur until at relatively high rotational speeds or at a relatively high power consumption, at a higher level than the predefined setpoint rotational speed or than the predefined setpoint current, so that as a result it is easily and reliably possible to infer that there is a leak in the secondary air system.

The secondary air system is particularly preferably detected as being leak-free if compressor surging or imminent compressor surging is detected within a predefined time period after the start of the activation of the compressor. That is to say if the duration up to the occurrence of compressor surging after the start of the activation of the compressor exceeds the predefined time period it is therefore possible to detect that there is a leak in the secondary air system, since, for example owing to air flowing out through the leak, it takes longer until the surge limit of the compressor is reached. It is therefore also possible to determine very easily whether the secondary air system is sealed.

The secondary air valve is preferably opened immediately after it has been detected that compressor surging is occurring or is directly imminent, in particular if the internal combustion engine is stationary. It is tested here whether compressor surging has stopped, which is to be expected in a fault-free state of the system. Subsequently, the activation of the compressor is stopped or repeated once more, and the reproducibility is tested. At the latest after repeated attempts, this prevents the compressor from being damaged by excessively long or excessively frequent compressor surging.

The method is particularly preferably carried out only in the passive state of the secondary air system, preferably after a heating phase of the internal combustion engine. That is to say that the method is only carried out if it is currently not required to blow in secondary air. This ensures that the actual blowing in of secondary air is not adversely affected by the described method which permits the testing for leaks. The method is preferably carried out after each start of the engine, in particular cold start of the engine, and preferably after stopping of the engine, at the end of a driving cycle.

Furthermore, the disclosure makes available an internal combustion engine comprising a primary air system for providing fresh air, and a secondary air system which is configured to branch off secondary air from the primary air system and blow it into an exhaust gas duct. The secondary air system has here a compressor for feeding the secondary air and a control device. The control device is preferably configured to carry out the method described above. The control device is configured here to activate the compressor and at the same time keep the secondary air valve closed. In addition, the control device is configured to determine whether compressor surging is occurring or is directly imminent and, in particular at the same time sense a sensor signal if compressor surging is occurring or is directly imminent. On the basis of the sensor signal it is possible for the control device to determine here whether there is a leak in the secondary air system. The internal combustion engine is therefore distinguished by means of a particularly simple and cost-effective design, wherein it can be efficiently and reliably determined whether there is a leak in the secondary air system.

The compressor is preferably a radial compressor, a diagonal compressor or an axial compressor. In this context, a radial compressor, which can provide a high pressure ratio with a small installation space and therefore permits a particularly high efficiency level of the blowing in of secondary air, is particularly advantageous here.

BRIEF DESCRIPTION OF THE DRAWINGS

An exemplary embodiment of the disclosure is described here in detail with reference to the accompanying drawing. Identical or functionally identical components are also provided with the same reference symbols. In the drawing.

DETAILED DESCRIPTION

Figure 1:
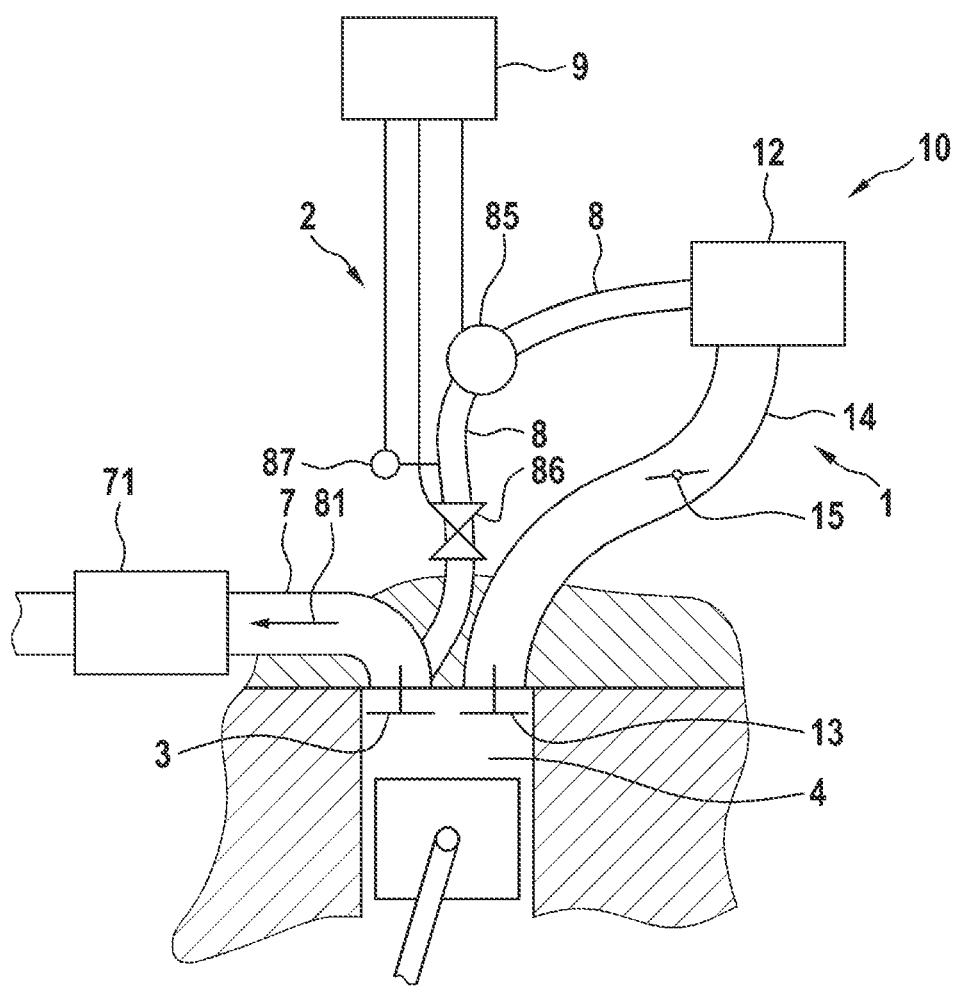
FIG. 1 shows a simplified schematic view of an internal combustion engine according to a preferred exemplary embodiment of the disclosure.

FIG. 1 shows a simplified schematic view of an internal combustion engine 10 according to a preferred exemplary embodiment of the disclosure.

The internal combustion engine 10 comprises a primary air system 1 for providing fresh air to a combustion chamber 4. The primary air system 1 has an air filter 12 from which the fresh air is fed via a primary air duct 14 to the combustion chamber 4 and is input there at an inlet valve 13 leading into the combustion chamber 4. In addition, a throttle valve 15 for regulating the quantity of fresh air is provided in the primary air duct 14.

In addition, the internal combustion engine 10 comprises an exhaust gas duct 7 which leads downstream from the combustion chamber 4 at an outlet valve 3, in order to discharge exhaust gases from the combustion chamber 4. A catalytic converter 71 is provided in the exhaust gas duct 7.

In order to permit a post-reaction of unburnt hydrocarbons and therefore the fastest possible heating of the catalytic converter 71 during a cold start phase of the internal combustion engine 10, the internal combustion engine 10 comprises a secondary air system 2. During the cold start, the secondary air system 2 branches off secondary air from the primary air system 1 and feeds the secondary air into the exhaust gas duct 7. In this context, the secondary air is blown into the exhaust gas duct 7 upstream of the catalytic converter 71 with respect to a direction 81 of flow through the exhaust gas duct 7.

The secondary air system 2 comprises a secondary air duct 8 which is connected to the air filter 12 of the primary air system 1 and branches off the secondary air from there and directs it into the exhaust gas duct 7.

In order to feed the secondary air, the secondary air system 2 comprises a compressor 85 which is embodied as a radial compressor. In addition, the secondary air system 2 has a secondary air valve 86 which is configured to open and close the secondary air duct 8.

Between the compressor 85 and the secondary air valve 86 there is a pressure sensor 87 which is configured to sense a pressure in the secondary air duct 8.

Furthermore, the internal combustion engine 10 comprises a control device 9. The control device 9 is configured to carry out testing of the leakproofness of the secondary air system 2, in order to be able to detect a possible leak in the secondary air system 2. The corresponding method for carrying out such a test for leaks is described below, also with reference to FIG. 2 which shows a compressor characteristic diagram of the compressor 85 of the internal combustion engine 10 in FIG. 1.

For this purpose, the control device 9 activates the compressor 85 and at the same time keeps the secondary air valve 86 closed. In this context, the rotational speed of the compressor 85 is slowly increased starting from the stationary state until compressor surging occurs or is imminent.

Compressor surging is detected here by the control device 9 by means of a sensor signal. In detail, a rotational speed signal of the compressor 85 is sensed for this. If the rotational speed signal of the compressor 85 begins to oscillate, this is identified by the control device 9 as the beginning of compressor surging.

In response to the detected compressor surging, the control device 9 immediately stops the activation of the compressor 85 in order to avoid damage to the compressor 85 owing to compressor surging which lasts for a relatively long time or is strong.

Here, the control device 9 is configured the rotational speed signal which is sensed at the time of compressor surging with an ideal rotational speed signal which has been determined and stored in a leak-free state of the secondary air system 2, for example at an initial activation of the secondary air system 2. In this context, the secondary air system 2 is preferably detected as leak-free if a rotational speed which is sensed when compressor surging occurs is lower than or equal to the ideal rotational speed. If, in contrast, compressor surging only occurs at relatively high rotational speeds, higher than the ideal rotational speed, it is concluded that there is a leak in the secondary air system 2.

Figure 2:
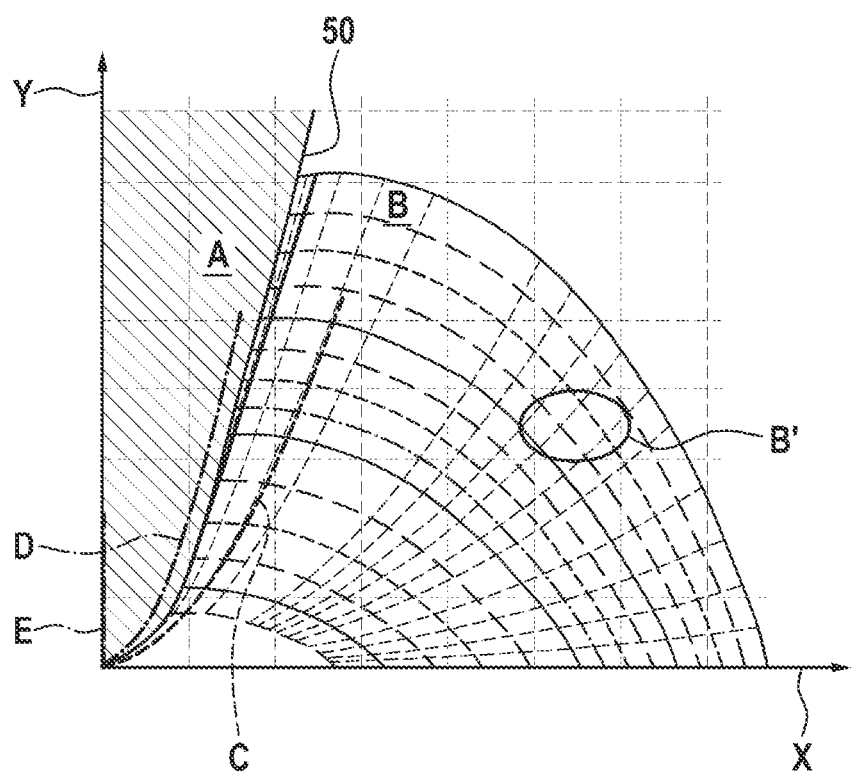
FIG. 2 shows a compressor characteristic diagram of a compressor of the internal combustion engine in FIG. 1.

Possible operating states of the compressor 85 are described below by means of the compressor characteristic diagram 100 in FIG. 2. An X axis of the compressor characteristic diagram 100 specifies here a mass flow of the air which is fed by the compressor 85, wherein a pressure ratio is entered on the Y axis.

The line 50 characterizes a surge limit of the compressor 85. An unstable area of the compressor 85 in which compressor surging can occur lies to the left of the surge limit 50. To the right of the surge limit 50 there is a stable area of the compressor 85, wherein for example a typical working area in the case of active blowing in of the secondary air is characterized by the area B'.

Possible cases which can be detected by means of the test for leaks are indicated for example by means of the lines C, D and E. It is to be noted here that these cases are merely indicated in a roughly and highly schematic simplified fashion.

Case E characterizes here, considered in an idealized fashion when there is no leak in the secondary air system 2. In this context, after the start of the activation of the compressor 85 the surge limit 50 is very quickly exceeded so that the compressor 85 begins to surge after a short time.

If there is a small leak in the secondary air system 2, case D may for example occur. Here, it takes a slightly longer time than in the ideal, leak-free case E until the surge limit 50 is exceeded, as a result of which it can be concluded that the leak is present.

If, for example, there is a very large leak in the secondary air system 2, case C may occur in which the surge limit 50 is not exceeded despite the secondary air valve 86 being closed. From this it can be unambiguously concluded that a large leakage mass flow of air is present.

By means of the internal combustion engine 10 it is therefore possible to conclude in a particularly simple and cost-effective way, without complex and expensive hardware, that a leak is present in the secondary air system 2.

It is to be noted that, as an alternative to or in addition to the sensing and analysis of the rotational speed signal, it is also possible to sense and analyze further sensor signals in order to detect compressor surging and/or a possible leak in the secondary air system 2. For example, the control device 9 can detect compressor surging by means of the pressure signal of the pressure sensor 87 and/or perform plausibility checking of the pressure signal in order to conclude on this basis that a leak is present in the secondary air system 2 and/or on the basis of a signal for the power consumption of the compressor.

What is claimed is:

1. A method for operating an internal combustion engine which comprises a primary air system for providing fresh air and a secondary air system, wherein the secondary air system is configured to branch off secondary air from the primary air system and blow it into an exhaust gas duct, wherein the secondary air system has a compressor for feeding the secondary air and a secondary air valve for shutting off or enabling the blowing in of secondary air, the method comprising:
   activating the compressor while the secondary air valve is kept closed;
   determining whether compressor surging is occurring or is directly imminent;
   sensing at least one sensor signal if compressor surging is occurring or is directly imminent; and
   determining whether there is a leak in the secondary air system on the basis of the sensed sensor signal.

2. The method according to claim 1, wherein the compressor is a radial compressor, a diagonal compressor or an axial compressor.

3. The method of claim 1, wherein the sensor signal has a rotational speed signal and/or a current signal of the compressor.

4. The method of claim 1, wherein:
   the secondary air system also comprises a pressure sensor, and
   the sensor signal has a pressure signal of the pressure sensor.

5. The method of claim 1, wherein compressor surging is detected by way of an oscillation of the sensor signal.

6. The method of claim 1, wherein in order to determine whether there is a leak in the secondary air system, plausibility of the sensor signal is tested by way of an ideal sensor signal which has been determined in a leak-free state of the secondary air system.

7. The method of claim 1, wherein a leak in the secondary air system is detected if the sensor signal lies outside a predefined value range.

8. The method of claim 7, wherein the value range is adapted as a function of the change in a geodetic height of the internal combustion engine and/or an ambient air pressure and/or an ambient temperature.

9. The method of claim 1, wherein a compressor rotational speed is increased during the actuation of the compressor.

10. The method of claim 1, wherein the secondary air system is detected as leak-free if compressor surging occurs within a predefined time period after the start of the activation of the compressor.

11. The method of claim 1, wherein directly after it has been detected that compressor surging is occurring or is directly imminent:
   the secondary air valve is opened, if the internal combustion engine is stationary, and/or
   the activation of the compressor is stopped, if the internal combustion engine is operating without secondary air being blown in.

12. The method of claim 1, wherein after the detection that there is no compressor surging occurring or delayed compressor surging is occurring, the method is repeated, in order to test for reproducibility.

13. The method of claim 1, wherein the method is carried out only in the passive state of the secondary air system after a heating up phase of the internal combustion engine.

14. An internal combustion engine, comprising:
a primary air system configured to provide fresh air;
a secondary air system configured to branch off secondary air from the primary air system and blow it into an exhaust gas duct, wherein the secondary air system has a compressor for feeding the secondary air, and control device, wherein the control device is configured to:
activate the compressor and at the same time keep the secondary air valve closed,
determine whether compressor surging is occurring or is directly imminent,
sense a sensor signal if compressor surging is occurring or is directly imminent, and
determine whether a leak is present in the secondary air system on the basis of the sensor signal.

15. The internal combustion engine of claim 14, wherein the compressor is a radial compressor, a diagonal compressor or an axial compressor.

16. The method of claim 9, wherein the compressor rotational speed is increased continuously during the actuation of the compressor.

* * * * *